United States Patent
Pitchon et al.

[15] 3,655,398
[45] Apr. 11, 1972

[54] PROCESS FOR MANUFACTURE OF COFFEE EXTRACT

[72] Inventors: Esra Pitchon, Flushing; Martin Gottesman, Suffern; Robert W. Meier, Massapequa, all of N.Y.

[73] Assignee: General Foods Corporation, White Plains, N.Y.

[22] Filed: May 25, 1970

[21] Appl. No.: 40,064

[52] U.S. Cl.................................99/71, 23/270, 23/272.5
[51] Int. Cl..............................................A23f 1/08
[58] Field of Search.................99/71; 23/272.5, 269, 267 C, 23/270

[56] References Cited

UNITED STATES PATENTS 2,915,399  12/1959  Guggenheim et al......................99/71
2,915,403  12/1959  Clinton et al..............................99/71
3,092,515  6/1963   Pike et al...............................23/267 C Primary Examiner—Frank W. Lutter
Assistant Examiner—William L. Mentlik
Attorney—Gerald E. Jacobs, Bruno P. Struzzi and Thomas V. Sullivan

[57] ABSTRACT

A new coffee extraction process has been discovered whereby a high concentration coffee extract, about 30–41 percent solids by weight of extract, can be produced in an ordinary percolation set with little, if any, loss of extraction yield. The key steps in this process include the use of intercolumn heaters to raise the temperature of the extraction liquor as it passes from column to column and reversing the flow of the extraction liquor through the extraction columns, at least in the spent end of the percolator set.

13 Claims, 3 Drawing Figures

INVENTORS.
ESRA PITCHON
MARTIN GOTTESMAN
ROBERT W. MEIER

PROCESS FOR MANUFACTURE OF COFFEE EXTRACT

BACKGROUND OF THE INVENTION

This invention relates to a method of producing coffee extract which is particularly suitable for further processing such as spray drying or freeze drying to obtain a dry instant coffee product. More specifically, it relates to an improved process for obtaining a high concentration of coffee solids in the extract.

The standard technique for producing coffee extract in a commercial coffee plant is to use a percolator set which is comprised of from 5 to 8 extraction columns wherein roasted and ground coffee is extracted by a countercurrent flow of extract and coffee through the percolator set. Typically, an aqueous liquor is pumped into the bottom of an extraction column containing the most extracted (or spent) coffee and the liquor then flows successively through the columns and is drawn off from the column containing the least extracted (fresh) roasted and ground coffee. The liquor drawn off it referred to as extract, or coffee extract, and has an average concentration of about 20–30 percent solids by weight of the extract. In practice, as soon as the aqueous liquor contacts coffee in the spent column, coffee solids start building up in the liquor and the liquor flowing through the columns is also referred to as extract. The concentration of the extract increases as it flows through the percolator set, and the final concentration in the extract draw-off is the maximum extract concentration. After each draw-off the coffee in the most spent column is emptied. The column is recharged with freshly roasted and ground coffee and this column which was the spent column then becomes the fresh column for draw-off on the next cycle.

In order to manufacture an instant coffee having certain desirable flavor and physical characteristics it has been found advantageous to spray dry a coffee extract having concentrations significantly higher than those achieved in standard percolation operations. Also, it has been found economically advantageous in a process for manufacturing freeze dried instant coffee to utilize higher concentration coffee extracts for freezing and freeze drying. It is a common practice in processes where higher concentration extracts than those obtained in standard percolation operations are needed, to concentrate the extract by vacuum evaporation or freeze concentration. These concentration techniques have major disadvantages. Vacuum evaporation tends to strip off desired aromatic constituents which must then be added back to the concentrated extract in an attempt to achieve a quality high concentration extract. Freeze concentration, while producing a more flavorful concentrated extract, is significantly more expensive than evaporative concentration techniques. Also, all of the extraction techniques used to concentrate the extract obtained in a standard percolation operation add to the cost and complexity of manufacturing a quality instant coffee.

In U.S. Pat. No. 2,915,403, in the name of Clinton, et al., a process was described and claimed for manufacturing a quality high concentration coffee extract. In this process the percolator set was divided into three sections. In the cold section the most spent ground coffee was extracted. In the hot section the extract flowing from column to column was increased in temperature in order to increase the rate of extraction. In the cooling section the standard technique of adjusting the temperature of the extract flowing into the column containing the freshly roasted and ground coffee was used. The cooling section is used to control the temperature of the final extract drawn off from the percolator system in order to preserve the quality of the solids extracted in the fresh column, which are the most flavorful solids in the coffee extract. Intercolumn heaters are located between each two columns (e.g. In a six extraction column set of percolators there are six heaters.) and the extract flows through a column and a heater alternatively, whether or not the heater is being utilized to increase the temperature of the extract. Two disadvantages have been associated with the process thus described. It has been difficult to achieve the desired extraction yields utilizing the Clinton, et al. process. Also, when using the inter-column heaters described by Clinton, et al., the system develops pressure trouble which causes an intolerable number of shutdowns and cleanups, thus making the process economically undesirable.

SUMMARY OF THE INVENTION

It has now been discovered that by using only one or two intercolumn heaters in a percolator set and reversing the direction of flow of the extract through the columns, in the spent end of the percolator set, it is possible to attain a high solids concentration extract (solids content of 30–41 percent) with little if any loss of yield and without encountering operation difficulties which necessitate frequent shutdowns in the prior art processes. The precise reason for the importance of reversing the direction of flow of the extract is not known. However, it has been demonstrated that reducing the number of heaters from those utilized in the Clinton, et al. process does not, by itself, permit sustained trouble-free operation of a percolator set producing concentrated coffee extract. It has also been found, that in utilizing the process of this invention, it is not necessary to have the initial cold section described in the Clinton, et al. process.

The process of this invention is suitable for use with any blend of roasted and ground coffee and the coffee may be either decaffeinated or undecaffeinated.

The process of this invention may be best described as utilizing a standard percolator set, with one or two inter-column heaters. In the spent end of the percolator set the coffee grounds are contacted with a hot extraction medium, typically hot water, as in any standard percolation operation. The extract produced in this section of the percolator set is very dilute. Generally the extraction medium flows through the extraction columns from the bottom of a column up through the column and out the top of the column. After the extract has passed through at the least one extraction column, and prior to introducing the extract into the next adjacent extraction column, it is passed through a heat exchanger (intercolumn heater) wherein the temperature of the extract is raised about 5° to 30° F. If a second intercolumn heater is being used, the flow of extract will be diverted through this heat exchanger and the temperature of the extract will again be raised about 5° to 30° F. The extract, after passing through an intercolumn heater, will always flow through at least one extraction column prior to passing through the second intercolumn heater. As in a standard percolator operation, the extract will flow through a cooler prior to being introduced into the extraction column containing the freshly roasted and ground coffee (fresh column). The cooler is used to adjust the temperature of the extract and coffee in the fresh stage so that the temperature of the final concentrated extract drawn off from the fresh stage is maintained at a maximum temperature 210° F., and typically between 170° to 210° F.

As previously indicated, the flow of extract in a standard percolation operation is typically from the bottom to the top of an extraction column (upflow) in all of the extraction columns. In the process of this invention the direction of flow through the columns is reversed at one point in the percolator set. It is preferred to start with upflow through the extraction columns and then reverse the flow through the column immediately after the first intercolumn heater. Thus, the flow through the remaining columns in the set would be from top to bottom through the column (downflow). In practicing the process of this invention, downflow through the spent columns and upflow through the remaining columns is an alternative combination. When using this arrangement, it may be preferred to reverse the flow a second time, prior to going into the fresh column, and use downflow in the fresh column. Also, in practicing the process of this invention, the direction of flow of the extract can be reversed after the spent column, regardless of where the intercolumn heater is located.

The key to the successful operation of this process is the use of one or two intercolumn heaters and reversing the direction of flow of extract through the extraction columns after the extract has passed through at least the spent column.

In practicing the process of this invention it is possible to achieve extract concentrations of about 30 to 41 percent solids by weight of the extract with little, or no loss of yield. Also, the process of this invention avoids frequent, lengthy shutdowns which are encountered in prior art processes using intercolumn heaters.

DESCRIPTION OF THE PREFERRED EMBODIMENT

Figure 1:
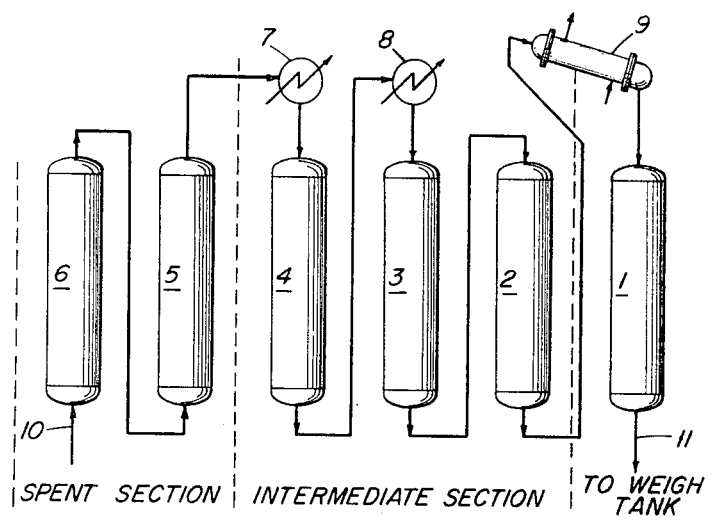

FIG. 1 shows a set of percolators consisting of six extraction columns, 1–6. While the number of extraction columns in a percolator set may vary, typically from 5–8 columns, six columns is a preferred number and the experiments and graphs hereinafter described refer to operation of a six extractor column percolator set.

As depicted in FIG. 1, column 6 contains the most spent (most extracted) roasted and ground coffee and the degree of extraction of the coffee in the other columns decreases as the number of the column decreases until column 1 which contains freshly roasted and ground coffee. In the standard percolation operation the extraction liquor, typically hot water, would be pumped into the bottom of column 6 at 10, pass on through column 6, a very dilute extract would flow out the top of column 6 and successively flow into the bottom of each next adjacent column and out the top until extract reached the bottom of column 1. The concentration of the extract would increase as it passed through each successive column. In the standard percolation operation prior to entering column 1 the extract would pass through cooler 9 and then be pumped into column 1 through the bottom of the column. When column 1 was filled with extract the final extract would be drawn off column 1 into a weigh tank and a predetermined weight of extract would be drawn off. While the extract is being drawn off from column 1 the feed water would be diverted to the bottom of column 5 and column 6 would be isolated. The fully extracted grounds are blown out of the column, and the column refilled with freshly roasted and ground coffee. When the draw-off from column 1 was completed the extract flow from the top of column 1 would then be diverted to the bottom of column 6 which would then become a new fresh stage. The extractor columns are connected by a pipe arrangement commonly referred to as manifolding such that any of the columns in sequence can be a spent stage or a fresh stage.

The flow of extract through a cooler prior to filling the fresh stage may also be accomplished by rearranging the flow patterns in the manifolding The cooler is used to control the temperature of the extract going into the fresh stage so that the final extract drawn off will be at a controlled temperature. The draw-off temperature will vary between 170° and 210° F. and in order to obtain a quality extract the maximum draw-off temperature should not exceed 210° F.

The concentration of the extract and the yield obtained from the coffee (yield being measured as the percentage of solids in the extract based on the dry solids in the freshly loaded extractor column) will be dependent upon many variables such as the blend of coffee used, the total time of extraction, the feed water temperature and the draw off factor (DOF), e.g. the amount of extract finally drawn off from the fresh stage divided by the weight of roasted and ground coffee in the fresh stage.

Figure 2:
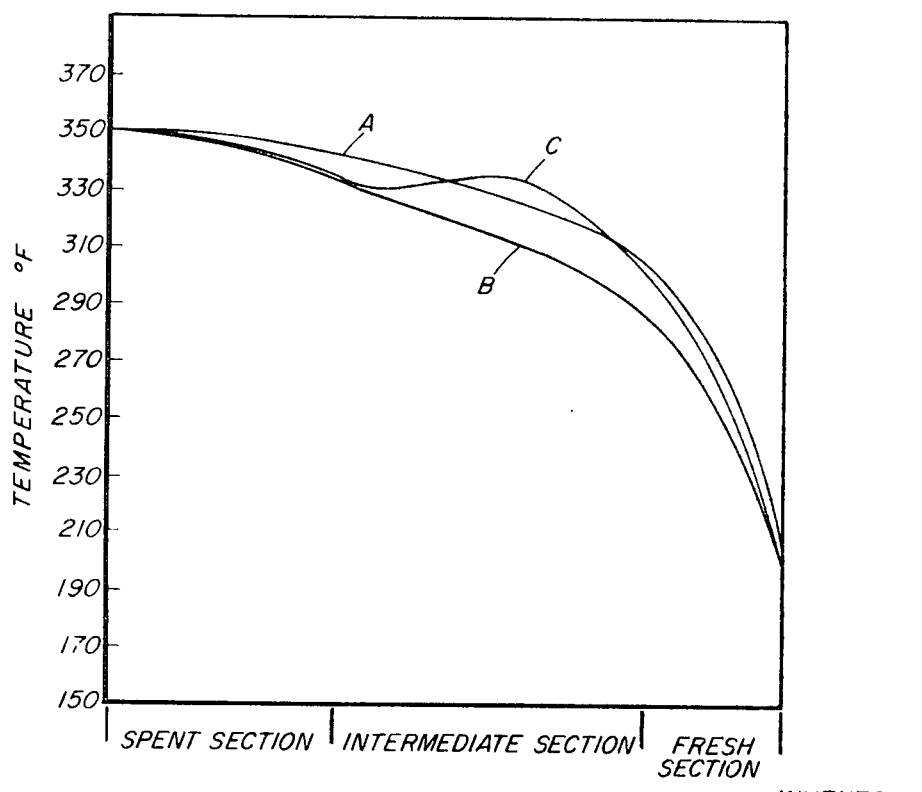
Figure 3:
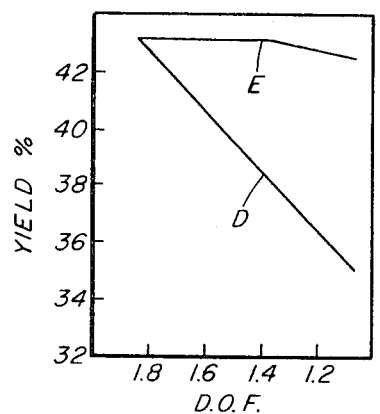
Figure 4:
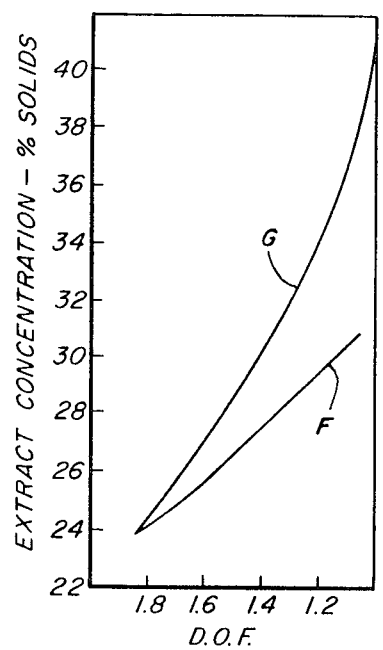

As the extraction liquor flows through the percolator set there is a heat loss across each column thus causing the temperature of the extract passing into and out of each column to vary in a given cycle and from cycle to cycle. (Cycle is the term used to describe the time between completion of successive draw-offs.) In FIG. 2, curves A and B show average extract temperatures across a percolator set at a time period just before the spent stage is isolated and blown down. The feed water temperature and extraction time are identical for the runs producing curves A and B (hereinafter referred to as runs 1 and 3, respectively). The major difference between the two runs was the blend of coffee used and the draw off factor. In the run producing curve A (run 1) the blend of coffee contained about 35 percent Robusta coffees while the coffee in run 2 contained only about 20 percent Robusta coffees. It has been found that yield varies in a direct relationship to the quantity of Robusta coffee in a bland. The major difference between runs 1 and 3 was the DOF. In run 1, depicted by curve A, the DOF was 1.85 (e.g. for every pound of roasted and ground coffee in the fresh stage 1.85 pounds of extract were drawn off). The DOF in run 3 was 1.47. Curve D, in FIG. 3, shows that for a given blend of coffee the yield will vary directly with the DOF. Curve F, in FIG. 4, shows the inverse relationship between extract concentration and DOF. Thus, in run 1, the final extract concentration was 24 percent and the final yield was 45 percent, while in run 3 the final yield was 40 percent and the final extract concentration was about 27 percent. In spite of the blend differences between runs 1 and 3, it is readily apparent that in a standard percolation operation, to achieve higher concentrations at reasonable temperatures, a significant decrease in yield must be anticipated. Feed water temperature is generally limited to about 330° to 370° F. The upper limit is necessary to avoid operating difficulties and insure a quality product. The lower limit is generally adhered to in order to achieve economic yields. As indicated previously, the draw-off temperature is controlled to insure a quality product.

In the process of this invention the percolator set may be considered divided into three sections. The first section is the spent section, shown in FIG. 1 as encompassing two extractor columns 5 and 6. The flow of extract and temperature drop across this section is similar to that encountered in a standard percolation operation. The second section of the percolator set, the intermediate section, encompasses all of the remaining extractor columns other than fresh stage. In the process of this invention, before the extract is allowed to enter an extractor column in the intermediate section, it is passed through a heater wherein the temperature of the dilute extract coming off column 5 is heated. FIG. 1, shows two intercolumn extract heaters 7 and 8. The arrangement of heaters 7 and 8 prior to columns 4 and 3 are a preferred embodiment of this invention. This invention may also be practiced by utilizing only one heater 8, and in such an arrangement the spent section would encompass extractor columns 6, 5 and 4, when the heater is in the preferred position of heater 8. As the extract passes through a heater the outlet temperature is controlled at a preselected temperature dependent upon the coffee being extracted, the DOF being used and the desired concentration and yield. In a typical run the average increase in temperature across a heater will vary from about 5° to 30° F. The actual increase in temperature will be greatest at the beginning of a cycle (e.g. when extract is being fed to a fresh stage in order to fill the fresh stage) and will be lowest at the end of a cycle (e.g. when the spent stage is being blown down), as the temperature of the extract coming out of the column preceding the heater will decrease from the start to the end of the cycle. Other heater arrangements are contemplated in practicing the precess of this invention. Thus, a single heater may be used in a position between columns 5 and 4. Also, two heaters may be used, one between columns 6 and 5 and one between columns 4 and 3. It is preferred not to use a heater between columns 3 and 2 as the increased extract temperature at this point in the system may have an adverse effect upon the extract quality.

It is an embodiment of this invention that the heaters are utilized at all times while the percolator set is in operation. Therefore, the manifold arrangement is such that extract can be fed from any column through any heater, so that as the position of the columns change from fresh column to spent column, the flow of extract to a heater can be from the appropriate column. This manifold arrangement is desirable as there is a tendency for coffee solids (including waxes and tars) to settle out and carbonize in a heater. If heaters are placed between each two adjacent columns and only utilized when the particular column is in the position of column 5 or column 4 in FIG. 1, these solids tend to solidify while the heater is not in use and the efficiency of the heat exchanger is thereby drastically reduced. This fouling of the heat exchangers necessitates frequent and long shutdowns for heater cleanup. The design of the manifolding should be such to insure that there are no dead spots and that the extract velocity through the manifolding is sufficient to avoid buildups in the manifold itself. A high enough velocity in the heat exchanger should be maintained to minimize fouling without causing an excessive pressure drop across the percolator set. By utilizing only 1 or 2 intercolumn heaters, as opposed to heaters between each two adjacent columns, higher pressure drops across each heater (and thus higher velocities) can be tolerated without causing an unreasonable pressure drop across the percolator set.

Unexpectedly, it has been found that even when the intercolumn heaters are utilized during the entire time that the percolation set is in operation (as in the process of this invention) pressure trouble is encountered in the extractor columns sufficient to require shutting down the percolator set to clean bayonet screens located at the top and bottom of each extraction column. For this reason quick pull bayonets are recommended when using intercolumn heaters so that the bayonet screens can be rapidly replaced when necessary without the need for an extensive shutdown. Absent the process of this invention, even with the use of quick pull bayonets, it was found that the percolator set was not operable for more than several hours at which time a lengthy shutdown for extensive cleaning was necessary. By utilizing the process of this invention, intercolumn heaters combined with reversal of the direction of extract flow, it has been found that the bayonets only require cleaning about once a week and that the percolator set can be operated for at least a month (the standard period of operation in a standard percolation operation) before shutting down for an extensive cleanup.

Thus unexpectedly, and a key to the process of this invention was the discovery that is the flow of extract through the percolator columns is reversed at some point in the percolator set, at least before entering the intermediate section, the pressure problems otherwise encountered when using intercolumn heaters, are alleviated. The precise reason for this is unknown, although there is speculation that it involves reversing the migration of fines within a percolator column, back-flushing the bayonets and loosening the bed of coffee within the extraction column. Thus, as shown in FIG. 1, the flow of the extraction liquor in the spent section is into the bottom of column 6, out the top of column 6, into the bottom of column 5 and out the top of column 5. The flow is then reversed after passing through heater 7 and set into the top of column 4 and all of the other columns in the set. When operating with only one heater in the position of heater 8, the flow would be reversed between columns 4 and 3. Reversal of the direction of flow after the extract passes through the first heater is a preferred embodiment of this invention. It has been found satisfactory to reverse the direction of flow after passing through only column 6 and before any heater is utilized. Also, upflow in the spent columns and downflow in the fresh columns is a preferred embodiment. In practicing the process of this invention, it is also possible to use downflow in the spent columns and upflow in the fresh columns. When utilizing this latter arrangement, it may also be desirable to reverse the direction of flow a second time and use downflow in the fresh column. As an alternative to this latter reversal of flow, the fresh column may be filled via downflow and extract can then be drawn off via upflow through the fresh column.

By utilizing the process of this invention it is possible to obtain extract concentrations of from 30 to 41 percent with little if any yield penalty. Curve C in FIG. 2, generated in percolation runs hereinafter referred to as runs 2 and 4, is a temperature profile across the percolator set utilizing heaters 7 and 8 in FIG. 1. When processing the same blend of coffee as used in run 1 the draw off factor for run 2 was 1.28 and a yield of 45 percent at a concentration of 35 percent was achieved. When utilizing the coffee used in run 3, run 4 resulting in a 40 percent yield at an extract concentration of 32 percent. Thus, it is quite apparent that the processing of this invention resulted in significantly higher extract concentrations at no yield penalty. The aforementioned runs are summarized in the following table:

|  | Run No. 1 | Run No. 2 | Run No. 3 | Run No. 4 |
| --- | --- | --- | --- | --- |
| Robusta Content | 35% | 35% | 20% | 20% |
| Heaters Used | None | 2 | None | 2 |
| DOF | 1.85 | 1.28 | 1.47 | 1.28 |
| Av. Yield (%) | 45% | 45% | 40% | 40% |
| Av. Extract Concentration (%) | 24% | 35% | 27% | 32% |

In FIG. 2, run number 1 is represented by curve A, run number 3 is represented by curve B and runs 2 and 4 are represented by curve C. It is readily apparent from FIG. 2 that the major difference in the temperature profiles is in the intermediate section of the percolator set wherein the extract temperature is increased by utilizing the intercolumn heaters. The results of operating via the process of this invention are readily apparent in run number 2. The extract concentration was increased 11 percent absolute as compared to run number 1 at no yield penalty. In run number 4 the extract concentration was increased 5 percent absolute at no yield penalty. Curve E, in FIG. 3, shows the relationship of yield to DOF utilizing the process of this invention. Until the DOF is reduced to about 1.2, it is possible to adjust the profile to essentially prevent loss of yield. Whereas the yield drops rapidly in standard percolation operations as the DOF is reduced as shown by curve D. In FIG. 4, curve G shows the relationship between extract concentration and DOF for a given blend of coffee utilizing the process of this invention. It is readily apparent that at a given DOF, significant increases in concentration are achieved using the process of this invention as compared to standard percolation operations which are represented by curve F.

In all of the prior examples the original feed water was introduced into the bottom of the spent column. In practicing the process of this invention it is also possible to have the original feed water enter the top column 6 and be drawn off the bottom of column 6, in which event, after reversing the flow of extract at the intercolumn heater the flow of extract would then be from the bottom of the column up through the column and out the top of the column. A key element in the process of this invention is the reversal of the flow of the extract through the columns after it passes through at least one extraction column.

When practicing the process of this invention, it has been found that the concentration of the dilute extract coming off column 5 is generally about 5 to 15 percent solids by weight of the extract, that the concentration of the extract coming off column 4 is about 10 to 20 percent and that the extract concentration prior to the fresh column is about 15 to 35 percent. These concentrations will vary depending upon the type of coffee processed, the DOF, extraction time, temperature profile, the number of columns in the percolator set and the number of intercolumn heaters utilized.

Having thus described the process of this invention, the invention is intended to be limited only by the appended claims.

What is claimed is:

1. A coffee extraction process for producing concentrated coffee extract by contacting progressively fresher roasted and ground coffee counter-currently with an aqueous extraction liquor in a percolator set which comprises contacting most spent roasted and ground coffee with a heated extraction liquor thus forming a dilute coffee extract, heating the dilute extract, contacting the heated dilute extract with roasted and ground coffee in an intermediate section of the percolator set thus forming an extract of intermediate concentration, cooling the intermediate concentration extract, contacting fresh roasted and ground coffee with the cooled intermediate concentration extract and drawing off a desired quantity of high concentration extract, said high concentration being from 30 to 41 percent solids by weight of the extract; the temperature of said concentrated extract being about 170° to 210° F.; said percolator set being a series of extractor columns connected by manifolding means to permit the flow of the aqueous extraction liquor to pass into a column, through the column, out of the column and into an adjacent column; the direction of flow of the aqueous extraction liquor through the extractor columns being reversed prior to passing through the intermediate section of the percolator set.

2. The process of claim 1 wherein the aqueous extraction liquor is introduced into the extraction column containing the most spent roasted and ground coffee at a temperature of from 330° to 370° F; the dilute extract temperature being increased in an intercolumn heat exchanger an average of about 5° to 30° F.

3. The process of claim 2 wherein the flow of the aqueous extraction liquor is into the bottom of the extraction column containing the most spent roasted and ground coffee, up through said column, out the top of said column and into the bottom of the next adjacent column, he flow continuing from bottom to top until the intermediate concentration extract passes through the heat exchanger; the direction of flow then being reversed and passing from the top of a column, through the column and out the bottom of the column through all of the remaining columns in the percolator set.

4. The process of claim 3 wherein the direction of flow through the columns is changed after the column containing the most spent roasted and ground coffee.

5. The process of claim 3 wherein the initial flow is in to the top of the column and out the bottom of the column and after the direction of flow is changed the flow through the remaining columns is into the bottom of a column and out the top of the column through all the remaining columns in the percolator set.

6. The process of claim 5 wherein the direction of flow through the columns is changed after the column containing the most spent roasted and ground coffee.

7. The process of claim 5 wherein the direction of flow is changed a second time, prior to the column containing the fresh roasted and ground coffee, such that flow through said column is into the top and out the bottom.

8. The process of claim 2 wherein the extract passes through out intercolumn heat exchangers, the average temperature of the extract being increased about 5° to 30° F. in each heat exchanger.

9. The process of claim 8 wherein the flow of the aqueous extraction liquor is into the bottom of the extraction column containing the most spent roasted and ground coffee, up through said column, out the top of said column and into the bottom of the next adjacent column, the flow continuing from bottom to top until the intermediate concentration extract passes through the first heat exchanger; the direction of flow then being reversed and passing from the top of a column, through the column and out the bottom of the column through all of the remaining columns in the percolator set.

10. The process of claim 9 wherein the direction of flow through the columns is changed after the column containing the most spent roasted and ground coffee.

11. The process of claim 9 wherein the initial flow is into the top of the column and out the bottom of the column and after the direction of flow is changed the flow through the remaining columns is into the bottom of a column and out the top of the column through all the remaining columns in the percolator set.

12. The process of claim 11 wherein the direction of flow through the columns is changed after the column containing the most spent roasted and ground coffee.

13. The process of claim 11 wherein the direction of flow is changed a second time, prior to the column containing the fresh roasted and ground coffee, such that flow through said column is into the top and out the bottom.

* * * * *